(12) United States Patent
Cho

(10) Patent No.: US 11,715,580 B2
(45) Date of Patent: Aug. 1, 2023

(54) SEAL MOLD DIVIDED STRUCTURE FOR COMBINATION CABLE AND METHOD FOR MANUFACTURING THE SAME

(71) Applicant: Continental Teves AG & Co. oHG, Frankfurt (DE)

(72) Inventor: YongWoon Cho, Sejong (KR)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 253 days.

(21) Appl. No.: 15/684,505

(22) Filed: Aug. 23, 2017

(65) Prior Publication Data

US 2021/0210248 A1    Jul. 8, 2021

Related U.S. Application Data

(63) Continuation of application No. PCT/KR2016/001752, filed on Feb. 23, 2016.

(51) Int. Cl.
| | |
|---|---|
| *H01B 7/00* | (2006.01) |
| *H01B 7/18* | (2006.01) |
| *H01B 13/24* | (2006.01) |
| *H01R 13/58* | (2006.01) |
| *B60R 16/023* | (2006.01) |

(52) U.S. Cl.
CPC ............ *H01B 7/009* (2013.01); *H01B 7/187* (2013.01); *H01B 13/24* (2013.01); *H01R 13/5845* (2013.01); *B60R 16/023* (2013.01); *H01R 2201/26* (2013.01)

(58) Field of Classification Search
CPC ............... H01R 43/24; H01R 13/5845; H01R 2201/26; H01B 7/009; H01B 7/187; H01B 13/24; B60R 16/023

USPC ................. 439/604, 606, 505, 498
See application file for complete search history.

(56) References Cited

U.S. PATENT DOCUMENTS

| | | |
|---|---|---|
| 678,147 A | 7/1901 | Urie et al. |
| 2,933,550 A | 4/1960 | Cole |
| (Continued) | | |

FOREIGN PATENT DOCUMENTS

| | | |
|---|---|---|
| CN | 1364328 A | 8/2002 |
| CN | 201549861 U | 8/2010 |
| (Continued) | | |

OTHER PUBLICATIONS

Japanese Office Action dated Aug. 31, 2018 for corresponding Japanese Patent Application No. 2017-541091.

(Continued)

*Primary Examiner* — Gary F Paumen

(57) ABSTRACT

A seal mold divided structure for combination cable disclosed comprises the following structures: a first cable and a second cable separated from the combination cable; a connector provided at the end of the first cable; a division molding portion that molds the division part between the first cable and the second cable and keeps the first cable and the second cable separated from each other; a connector molding portion that molds the connection part between the connector and the first cable; and a protect tube, with its ends respectively fixed to the division molding portion and the connector molding portion to protect the first cable and prevent inflow of a molding compound.

6 Claims, 7 Drawing Sheets

(56) References Cited

U.S. PATENT DOCUMENTS

| | | | | |
|---|---|---|---|---|
| 3,128,140 | A * | 4/1964 | Stephenson, Sr. | F02P 17/06 73/114.65 |
| 6,428,344 | B1 * | 8/2002 | Reed | H01R 13/504 439/604 |
| 6,482,036 | B1 * | 11/2002 | Broussard | H01R 43/24 439/693 |
| 6,554,639 | B2 * | 4/2003 | Doriski, Jr. | H01R 27/02 439/498 |
| 6,748,147 | B2 | 6/2004 | Quinn et al. | |
| 6,767,255 | B1 * | 7/2004 | Croswell | H01R 31/02 439/651 |
| 6,802,741 | B1 * | 10/2004 | Shatkin | H01R 13/7137 439/106 |
| 7,035,112 | B2 * | 4/2006 | Chen | H05K 5/065 361/752 |
| 7,037,133 | B2 * | 5/2006 | Matsuo | H01R 13/56 439/527 |
| 7,229,302 | B1 * | 6/2007 | Lai | H01R 27/02 439/502 |
| 7,601,010 | B1 * | 10/2009 | Wu | H01R 13/6658 439/468 |
| 8,280,942 | B2 * | 10/2012 | Caveney | H04L 41/12 709/200 |
| 8,376,782 | B2 * | 2/2013 | Govekar | H01R 25/006 439/502 |
| 8,740,655 | B2 * | 6/2014 | Kato | H01R 43/24 439/736 |
| 8,975,524 | B2 * | 3/2015 | Kanai (Popovici) | H02G 3/0468 174/152 G |
| 9,011,179 | B2 * | 4/2015 | Siahaan | H01R 13/504 439/607.57 |
| 9,678,096 | B2 * | 6/2017 | Kobayashi | G01P 3/44 |
| 2001/0008814 | A1 * | 7/2001 | Tsukamoto | B60R 16/0215 439/502 |
| 2016/0254615 | A1 * | 9/2016 | Sugita | H01R 13/5205 439/606 |
| 2019/0071036 | A1 | 3/2019 | Kobayashi | |

FOREIGN PATENT DOCUMENTS

| | | |
|---|---|---|
| CN | 202068133 U | 12/2011 |
| CN | 202772331 U | 3/2013 |
| CN | 203387021 U | 1/2014 |
| CN | 204010769 U | 12/2014 |
| CN | 204155655 U | 2/2015 |
| JP | H0129194 Y2 | 12/1899 |
| JP | S541988 A | 1/1979 |
| JP | S55146614 A | 11/1980 |
| JP | S614373 A | 1/1986 |
| JP | 2013237428 A | 6/1989 |
| JP | H541988 Y2 | 6/1993 |
| JP | H07250414 A | 9/1995 |
| JP | 2005294132 A | 10/2005 |
| JP | 2011014413 A | 1/2011 |
| JP | 2012100460 A | 5/2012 |
| JP | 2013237428 A | 11/2013 |
| JP | 5434748 B2 | 3/2014 |
| JP | 2016091731 A | 5/2016 |
| JP | 2018507810 A | 3/2018 |
| WO | WO2014103499 A1 | 7/2014 |

OTHER PUBLICATIONS

International Search Report and Written Opinion dated Feb. 23, 2016 from corresponding International Patent Application No. PCT/KR2016/001752.
China Office Action dated Jun. 22, 2018 for corresponding Chinese Patent Application No. 201680006781.2.
Korea Office Action dated Apr. 12, 2016 for corresponding Korean Patent Application No. 10-2015-0025402.
Korea Office Action dated Aug. 12, 2015 for corresponding Korean Patent Application No. 10-2015-0025402.
Chinese Notice of Granting a Patent Right for Invention dated May 7, 2020 for the counterpart Chinese Application No. 201680006781.2.
Japanese Decision to Grant Patent dated Dec. 6, 2018 for Japanese Patent Application No. 2017-541091.
German Office Action dated Dec. 2, 2021 for the counterpart German Application No. 11 2016 000 868.6.

* cited by examiner

[Fig. 1]
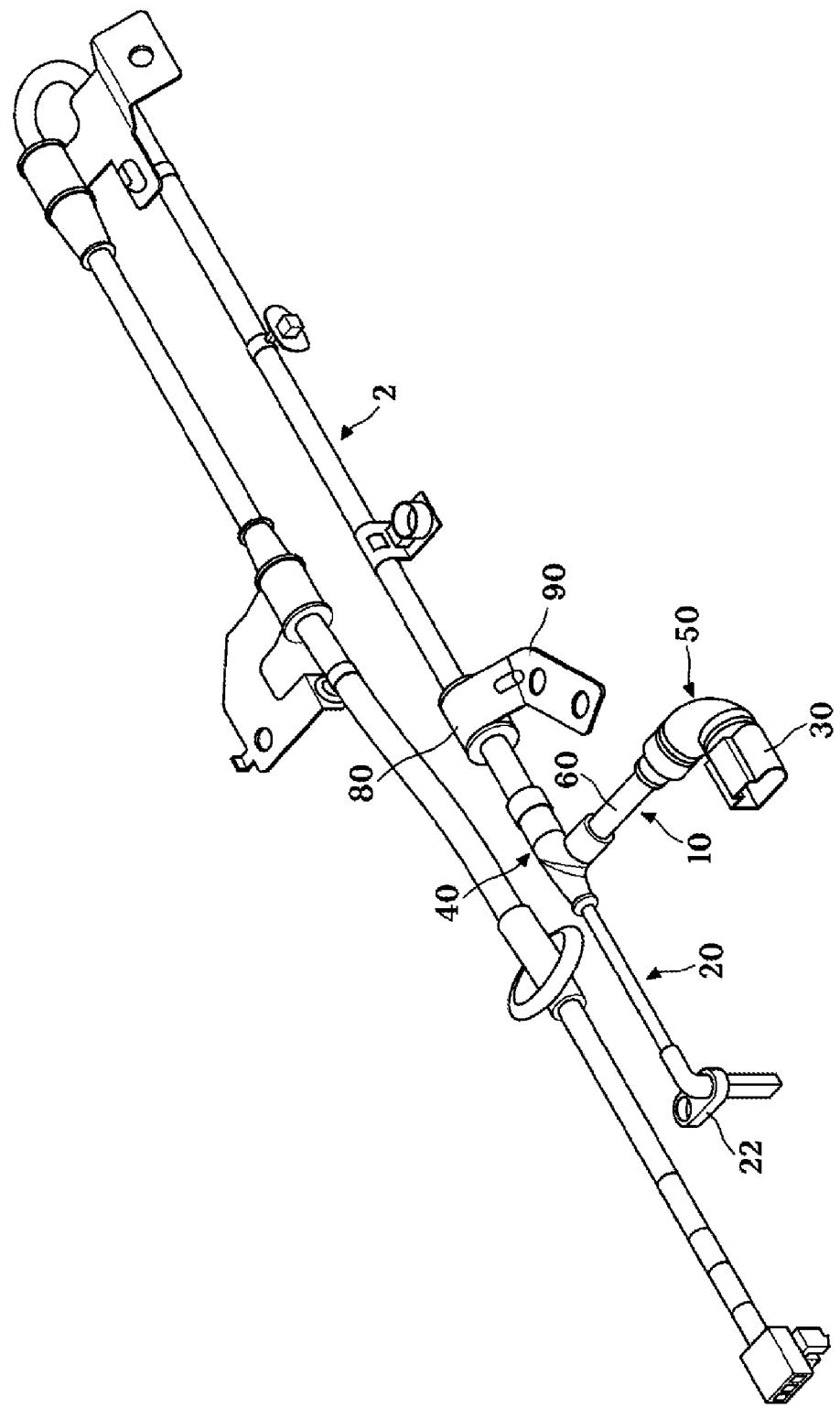

[Fig. 2]
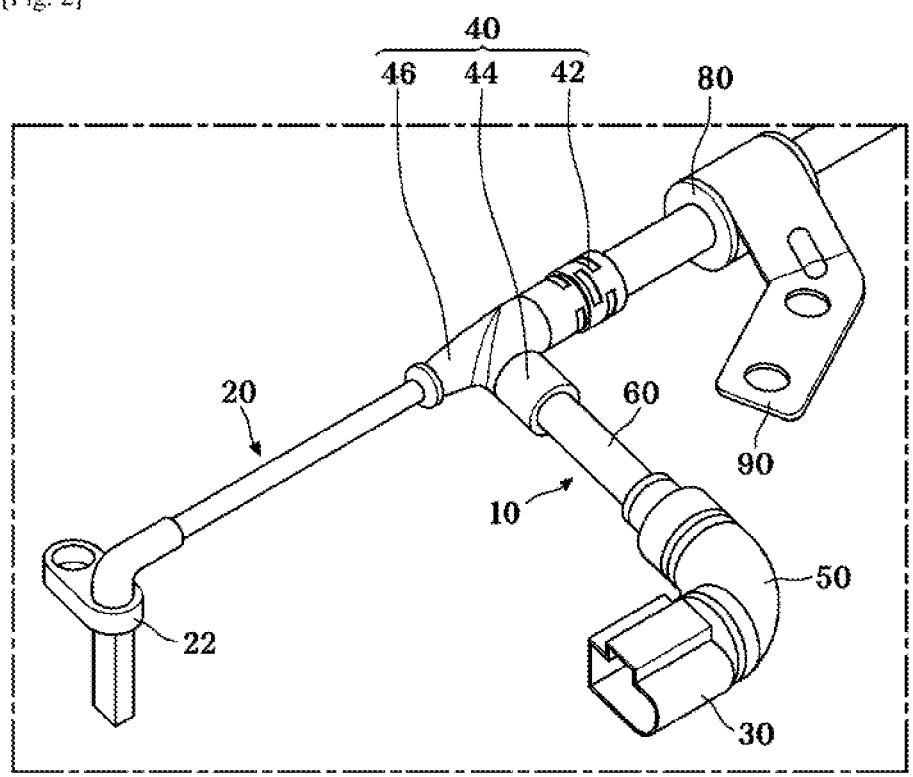

[Fig. 3]
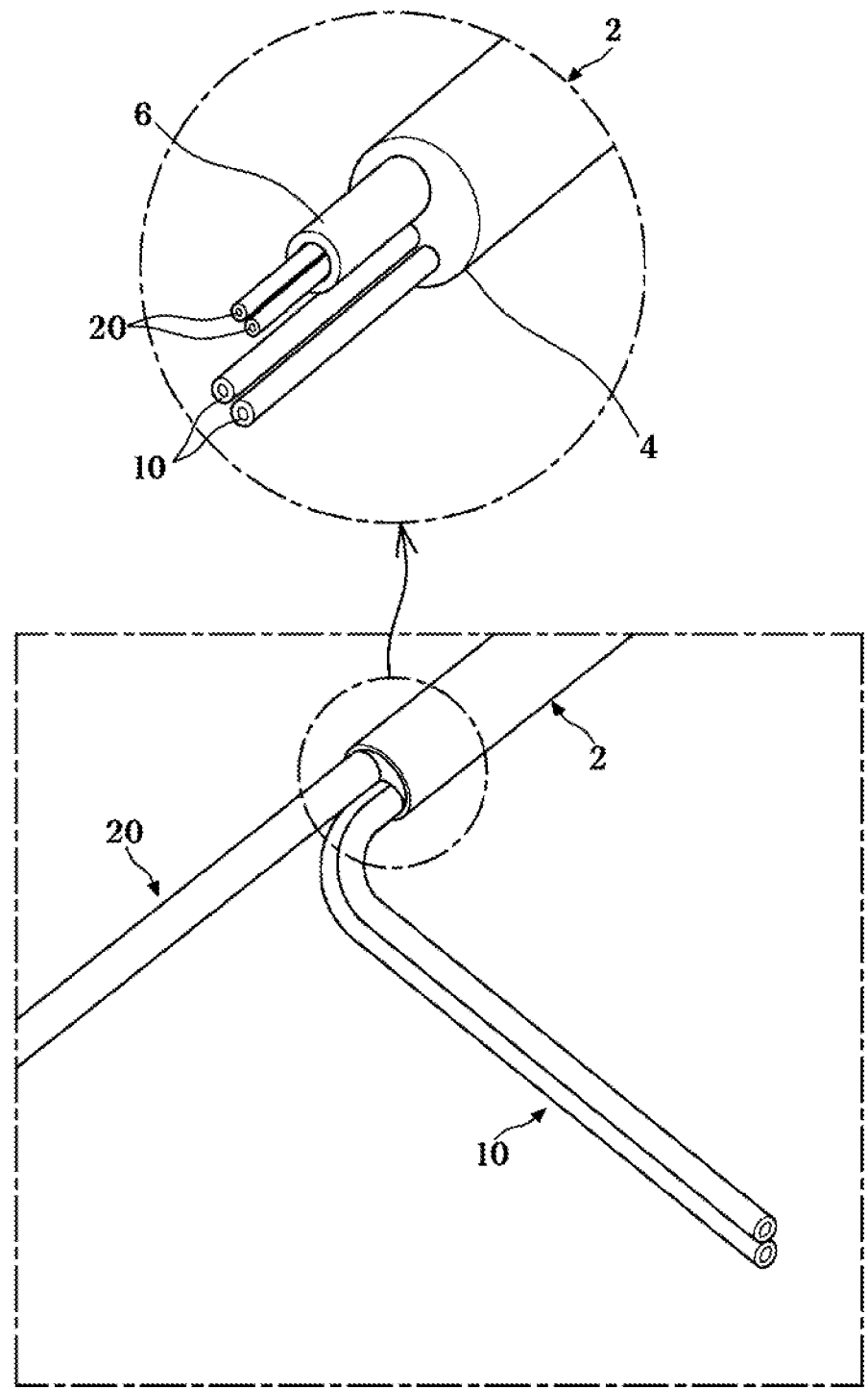

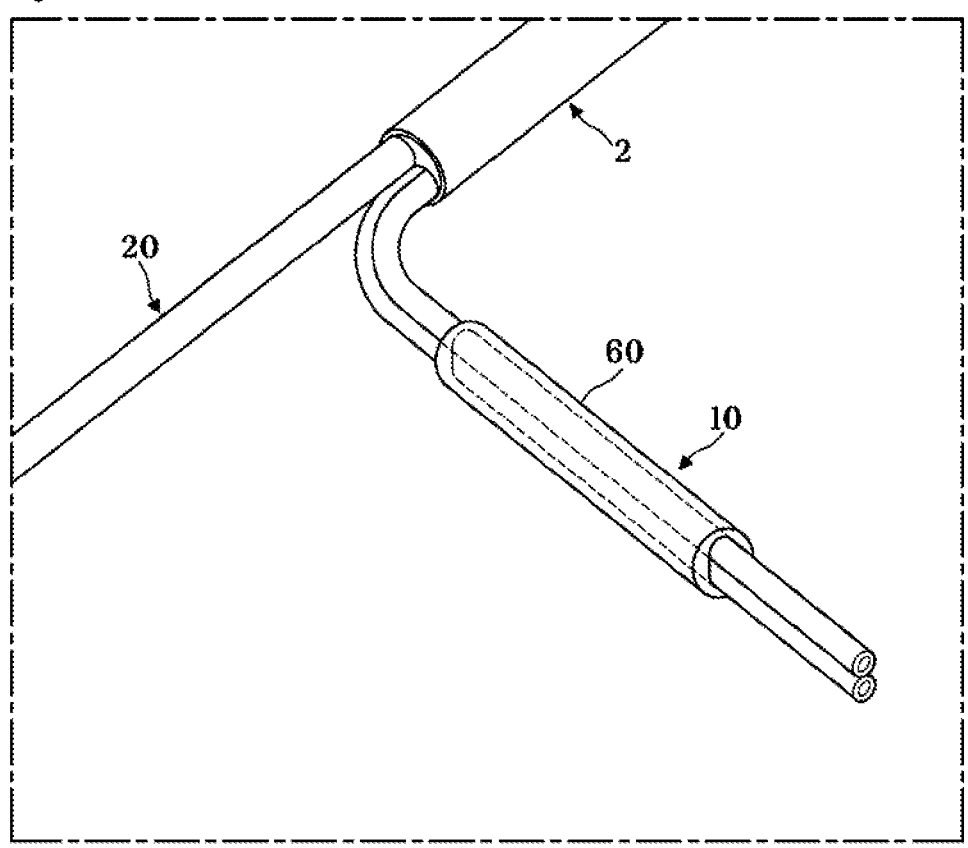
[Fig. 4]

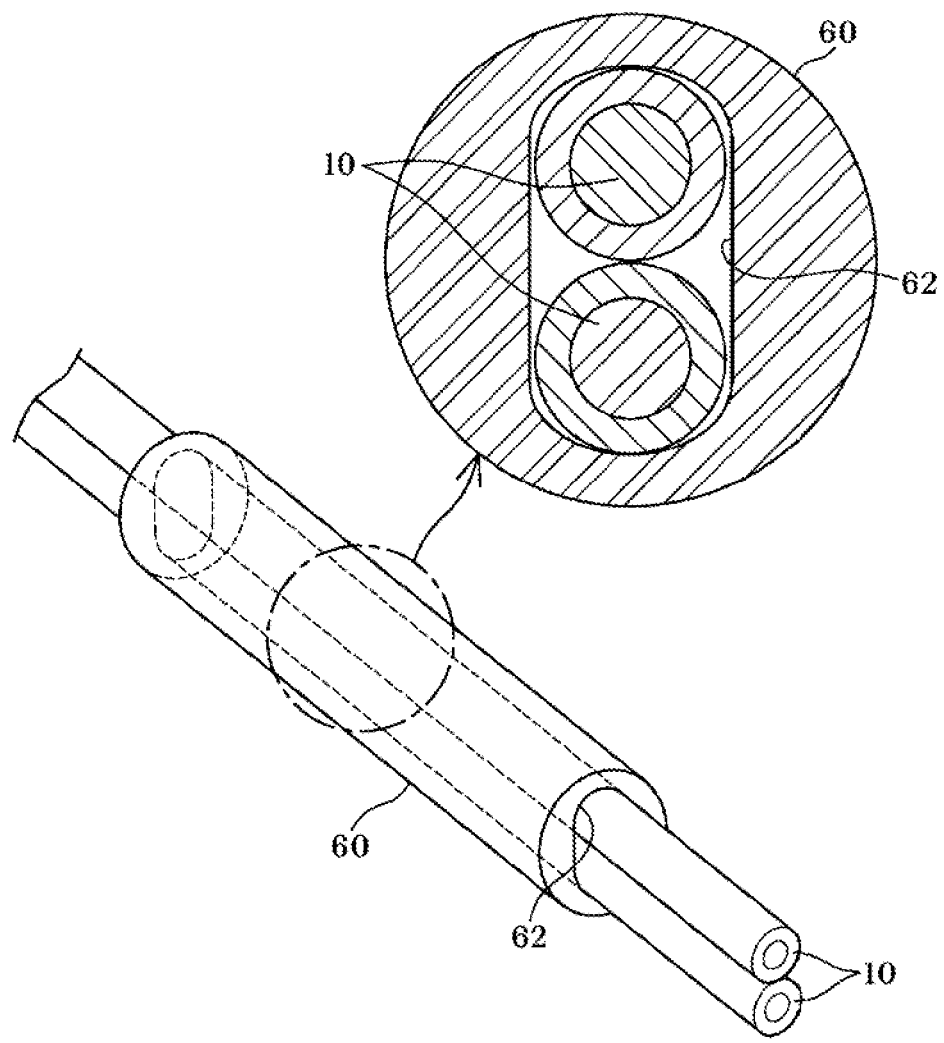
[Fig. 5]

[Fig. 6]
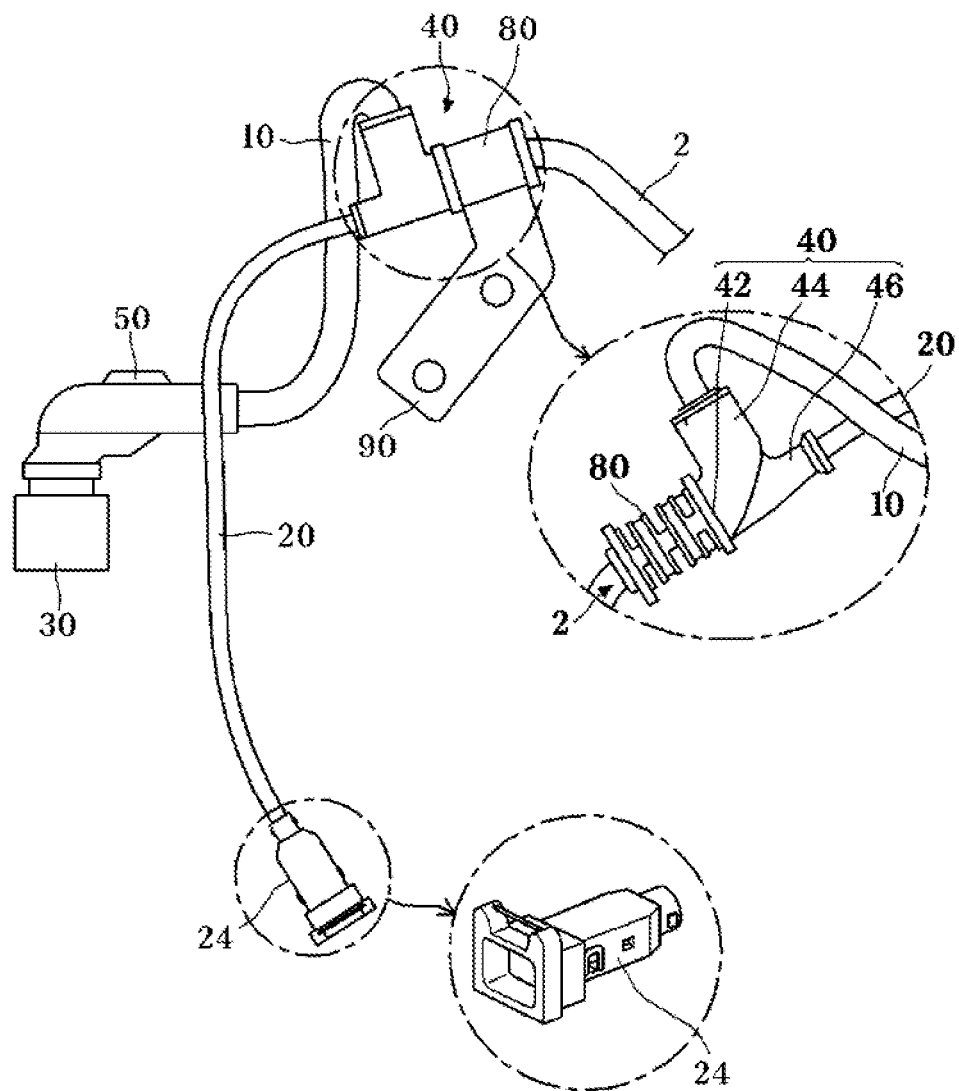

[Fig. 7]
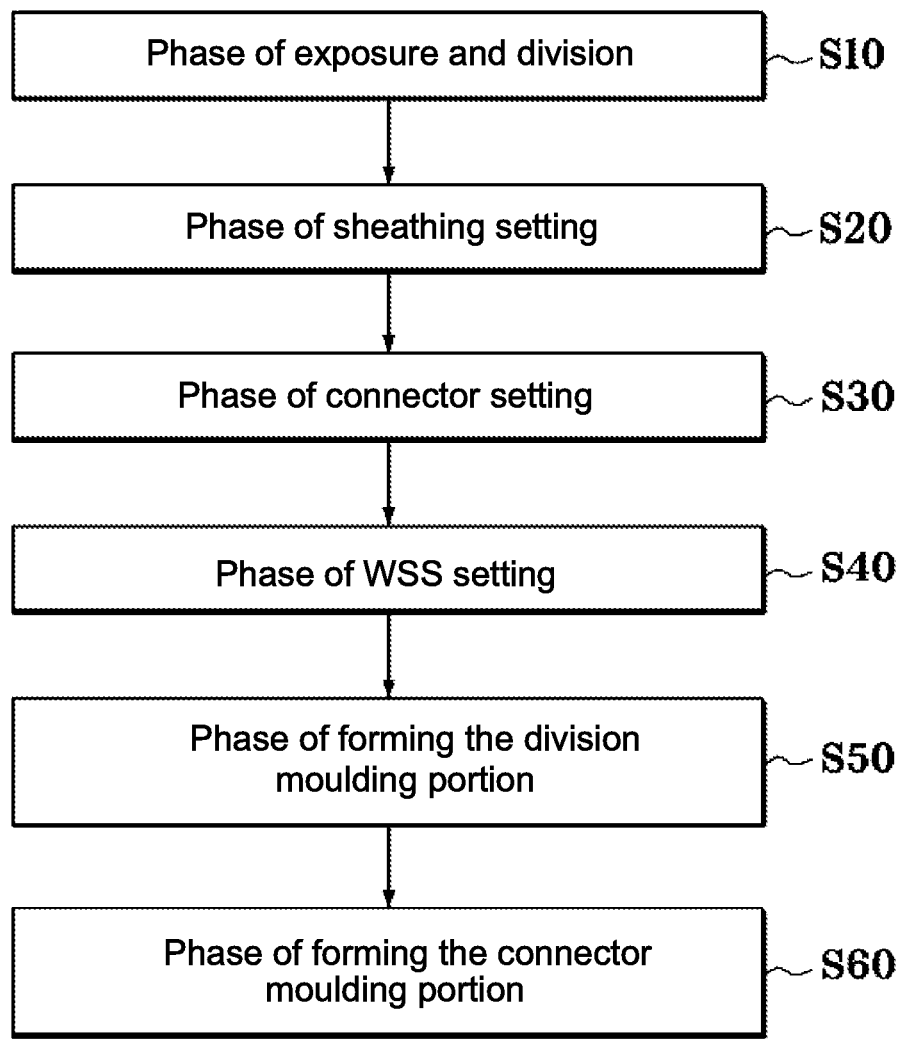

SEAL MOLD DIVIDED STRUCTURE FOR COMBINATION CABLE AND METHOD FOR MANUFACTURING THE SAME

CROSS-REFERENCE TO RELATED APPLICATION

This application claims the benefit of PCT Application PCT/KR2016/001752, filed Feb. 23, 2016, which claims priority to Korean Application 2015-0025402, filed Feb. 23, 2015. The disclosures of the above applications are incorporated herein by reference.

TECHNICAL FIELD

The present invention relates to a seal mold divided structure for combination cable and method for manufacturing the same.

BACKGROUND

Generally, the electronic parking brake (EPB) of a vehicle is a braking device that automatically locks the braking when the vehicle is stopped and automatically unlocks the braking once the acceleration pedal is stepped on at startup. As it can brake without the need of stepping on the brake, the EPB has been used in more and more vehicles.

By motor driving, the EPB grips or relaxes a disc, thus locking or unlocking the brake. An EPB cable, by using a connector, is connected to the motor to supply electric power. In addition, in order to sense the rotation speeds of wheels after an ABS is enabled, a wheel speed sensor (WSS) is equipped around the EPB. The WSS also transmits or receives sensing signals by using a cable.

However, in the past, an EPB cable and a WSS cable in a vehicle were equipped separately and connected to the motor and the WSS respectively. As the cables were set separately, it was difficult to sort out the cables clearly; consequently, the vehicle quality was affected.

In addition, in order to resolve the above-mentioned problem, an EPB cable and a WSS cable were bound and connected with each other. However, no suitable structure has been provided regarding the division point between a motor and a WSS to separate the cables.

The background art of the present invention is what is described in Korean registered patent No. 10-0589195 (title of invention: An Electrodynamic Automatic Braking Device for Vehicles, dated 12 Jun. 2006).

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A seal mold divided structure for combination cable and method for manufacturing the same is provided, wherein cables respectively connected to a wheel speed sensor and electronic parking brake are fixed integrally in a separate state and the inner surface of the protect tube is formed into an ellipse to prevent inflow of a molding compound.

The seal mold divided structure for combination cable disclosed comprises the following structures: a first cable and a second cable separated from the combination cable; a connector provided at the end of said first cable; a division molding portion that molds the division part between said first cable and second cable and keeps said first cable and second cable separated from each other; a connector molding portion that molds the connection part between said connector and said first cable; and a protect tube, with its ends respectively fixed to said division molding portion and said connector molding portion to protect said first cable and prevent inflow of a molding compound.

In addition, said connector can be used as the connector of an EPB and connect the WSS or the WSS extension cable connector to said second cable.

In addition, said division molding portion comprises the following structures: an integral portion, which wraps the outer surface of said combination cable and fixes it; a first division portion, which is formed by bending towards the side of the first cable exposed to said integral portion; a second division portion, which is formed by straightening towards the side of the second cable exposed to said integral portion.

In addition, in order that a right angle is formed between said connector and said first cable, said connector molding portion bends to take a "¬" shape.

In addition, the outer surface of said protect tube is circular.

In addition, the inner surface of said protect tube is elliptical and that the protect tube closely fits the outer surface of said first cable, which comprises two winding displacements, thus preventing the inflow of a molding compound.

In addition, in order to install a mounting bracket, a cord grommet portion is formed and integrated on the outer surface of said division molding portion.

In addition, said cord grommet portion is located on the integral portion of said division molding portion.

A method for manufacturing the seal mold divided structure for combination cable comprises the following phases: the phase of removing the sheathing of the combination cable to expose the first cable and the second cable and separating them; the phase of providing a protect tube on the outer surface of the separated first cable; the phase of providing an EPB connector at the end of said first cable; the phase of providing a WSS at the end of said second cable; the phase of wrapping and molding the division portion between said first cable and second cable and one end of said protect tube to form a seal molded portion; and the phase of wrapping and molding the division portion between said connector and said first cable and the other end of said protect tube to separate it from said seal molded portion, thus forming a connector molded portion.

In addition, the inner surface of said protect tube is elliptical and that the protect tube closely fits the outer surface of said first cable, which comprises two winding displacements, thus preventing the inflow of a molding compound.

With the seal mold divided structure for combination cable and method for manufacturing the same, the first cable and the second cable is respectively connected to an electronic parking brake and a wheel speed sensor are fixed integrally in a separate state.

In addition, on the outer surface of the first cable of an EPB, a protect tube is provided to protect the first cable against damages.

In addition, the inner surface of the protect tube is elliptical and the protect tube closely fits the outer surface of the first cable; thus, inflow of a molding compound into the protect tube can be prevented; in addition, by maintaining injection pressure, the molding performance can be improved.

In addition, a division molding portion is formed; it is formed by simultaneously wrapping and molding the second cable of the WSS and the first cable of the EPB, capable of keeping the first cable and the second cable in a stable state of division.

In addition, a cord grommet portion is formed on the division molding portion integrating the first cable and the second cable, capable of supporting the cables conveniently.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 shows an oblique view of the complete structure of a combination cable described in an embodiment of the present invention;

FIG. 2 shows an enlarged oblique view of the seal mold divided structure of a combination cable described in an embodiment of the present invention;

FIG. 3 shows the state in which the first cable and second cable are exposed after the sheathing of the combination cable is removed in an embodiment of the present invention;

FIG. 4 shows the state in which a protect tube is provided on the first cable in an embodiment of the present invention;

FIG. 5 shows a sectional view of the state in which the protect tube is provided on the first cable in an embodiment of the present invention;

FIG. 6 shows the state in which a cord grommet portion is formed on the division molding portion in a seal mold divided structure for combination cable according to the present invention; and FIG. 7 shows a flow chart of the procedure of manufacturing a seal mold divided structure of a combination cable described in an embodiment of the present invention.

DETAILED DESCRIPTION

By referring to the drawings, the following describes in detail the method for manufacturing a seal mold divided structure for combination cable according to the present invention.

For ease and clarity of description, representations of the line thickness or sizes of structure elements shown in the drawings may be exaggerated. In addition, the terms used in the following description are the terms defined according to the functions in the present invention and vary with the intentions of users and operators or usual practice. Therefore, these terms should be defined on the basis of the entire contents of this specification.

FIG. 1 shows an oblique view of the complete structure of a combination cable described in an embodiment of the present invention. FIG. 2 shows an enlarged oblique view of the seal molding divided structure of a combination cable described in an embodiment of the present invention. FIG. 3 shows the state in which the first cable and second cable are exposed after the sheathing of the combination cable is removed in an embodiment of the present invention.

FIG. 4 shows the state in which a protect tube is provided on the first cable in an embodiment of the present invention. FIG. 5 shows a sectional view of the state in which the protect tube is provided on the first cable in an embodiment of the present invention. FIG. 6 shows the state in which a cord grommet portion is formed on the division molding portion in the seal mold divided structure for combination cable according to the present invention.

FIG. 7 shows a flow chart of the procedure of manufacturing a seal mold divided structure of a combination cable described in an embodiment of the present invention.

As shown in FIG. 1 to FIG. 6, a seal mold divided structure of a combination cable described in an embodiment of the present invention comprises the first cable (10), the second cable (20), the connector (30), the division molding portion (40), the connector molding portion (50), and the protect tube (60).

As shown in FIG. 1 and FIG. 2, after the first cable (10) is separated from the combination cable (2), an electrical parking brake (EPB) is connected to its end. The first cable (10) is exposed outside by removing the sheathing (4) of the combination cable (2). The first cable (10) comprises two winding displacements, which can be configured with one below the other.

After the second cable (20) is separated from the combination cable (2), the wheel speed sensor (WSS) (22) or the WSS extension cable connector (24) is connected to its end. As shown in FIG. 3, the second cable (20) is exposed outside by removing the outer sheathing (4) of the combination cable (2). In this case, the second cable (20) may additionally have the inner sheathing (6) on the inner side of the outer sheathing (4); thus, the two winding displacements of the second cable (20) cannot be exposed until the inner sheathing (6) is removed. The WSS (22) is connected to the two winding displacements of the second cable (20) and operates. In addition, as shown in FIG. 6, the WSS extension cable connector (24) can further be connected to the end of the second cable (20).

The connector (30) is provided at the end of the first cable (10), allowing the EPB to work. After the connector (30) is connected to the end of the first cable (10), the connector molding portion (50) described below fixes it.

The division molding portion (40) is a molding structure that is molded in the divided part between the first cable (10) and the second cable (20) and keeps the first cable (10) and the second cable (20) in a divided state. By means of molding, the division molding portion (40) integrally fixes the combination cable (2), the second cable (20), which is formed by connecting to it in a straight line, and the first cable (10) division portion that bends into an n shape, so that the combination cable (2) keeps the first cable (10) and the second cable (20) in a divided state.

The division molding portion (40) comprises the following structures: the integral portion (42), which wraps and fixes the outer surface of the outer sheathing (4) of the combination cable (2); the first division portion (44), which is formed by bending towards the side of the first cable (10) exposed to the integral portion (42); the second division portion (46), which is formed by straightening towards the side of the second cable (20) exposed to the integral portion (42). In this case, the diameter of the first division portion

(44) almost remains the same from one end to the other end. This ensures that the first division portion (44) secures one end of the protect tube (60) and keeps the first cable (10) bent. In addition, the diameter of the second division portion (46) gradually increases from one end to the other end. The diameter of the second cable (20) is smaller than the diameter of the protect tube (60) that wraps the first cable (10). Therefore, a diameter the same as that of the protect tube (60) that wraps the first division portion (44) is maintained. In order to improve the flexibility of the second cable (20), its diameter is made to gradually decrease towards its end. The division molding portion (40) wraps the separated first cable (10) and second cable (20) and the combination cable (2) not separated, thus preventing intrusion of any foreign matters, such as moisture.

The connector molding portion (50) is a structure that molds the connection portion between the connector (30) and the first cable (10). The connector molding portion (50) can mold concurrently with, before, or after the division molding portion (40). The connector molding portion (50) bends to be n-shaped; thus, when the connector (30) is set, the first cable (10) can be bent to reach a preset degree and direction. The connector molding portion (50) is roughly right-angled. The connector molding portion (50) wraps the separated first cable (10) and part of the connector (30), capable of preventing intrusion of foreign matters, such as moisture.

As shown in FIG. 4 and FIG. 5, the protect tube (60) is a structure that protects the first cable (10), with its ends respectively fixed to the division molding portion (40) and the connector molding portion (50). The outer surface of the protect tube (60) is circular. The protect tube (60) can be made of Thermoplastic Poly Urethane (TPU) rubber. The protect tube (60) can also be made of one of other various types of rubber or soft synthetic resin. As shown in FIG. 5, the inner surface (62) of the protect tube (60) can be elliptic and the protect tube closely fits the outer surface of said first cable (10), which comprises two winding displacements, thus preventing the inflow of a molding compound. Therefore, when the division molding portion (40) and the connector molding portion (50) are molded respectively on either side of the protect tube (60), a molding compound can be prevented from flowing into the inner side of the protect tube (60) through the open spaces on both sides of the protect tube (60). In this case, the inner surface of the protect tube (60) is an ellipse (62). Due to rubbing action, it may be difficult to insert the first cable (10), which comprises two winding displacements. However, the protect tube (60) alone can block the inflow of a molding compound, without the need of any additional blocking component (not shown in the figure). Thus, the number of components can be reduced.

As shown in FIG. 6, in order to install the mounting bracket (90), the cord grommet portion (80) is formed and integrated on the outer surface of the division molding portion (40). As shown in FIG. 1, when the cord grommet portion (80) is set on the division molding portion (40) and in any other position on the combination cable (2), the number of components may increase. In contrast, as shown in FIG. 6, when the cord grommet portion (80) is integrated with the division molding portion (40), the number of components and manufacture costs can be reduced. In this case, if the cord grommet portion (80) is provided on the integral portion (42) of the division molding portion (40), it is convenient to install the mounting bracket (90).

By referring to FIG. 7, the following describes in detail the specific procedure of the method for manufacturing a seal mold divided structure for combination cable according to the present invention.

First, the method for manufacturing a seal mold divided structure for combination cable according to the present invention comprises the phase of exposure and division (S10), the phase of sheathing setting (S20), the phase of connector setting (S30), the phase of WSS setting (S40), the phase of forming the division molding portion (S50), and the phase of forming the connector molding portion (S60).

The phase of exposure and division (S10) is the phase of removing the outer sheathing (4) of the combination cable (2) to expose and separate partial sections of the first cable (10) and the second cable (20). In this case, part of the inner sheathing (6) possibly remains on the second cable (20).

The phase of sheathing setting (S20) is the phase of setting the sheathing (60) on the outer surface of the separated first cable (10). The outer surface of the sheathing (60) is circular, and the sheathing's inner surface (62) is elliptical. Therefore, the side face of the sheathing (60) fits the first cable (10) as closely as possible. When the division molding portion (40) and the connector molding portion (50) are molded, a molding compound can be prevented from flowing into the inner side of the protect tube (60).

The connector setting phase (S30) is the phase of setting the EPB connector (30) at the end of the first cable (10).

The phase of WSS setting (S40) is the phase of setting the WSS (22) at the end of the second cable (20).

The phase of forming the division molding portion (S50) is the phase of wrapping the division portion between the first cable (10) and the second cable (20) and one end of the protect tube (60) to form the division molding portion (40). The division molding portion (40) concurrently wraps the division portion between the first cable (10) and the second cable (20) and part of the combination cable (2), thus preventing intrusion of any foreign matters, such as moisture.

The phase of forming (S60) the connector molding portion (40) is the phase of wrapping the connection portion between the connector (30) and the first cable (10) and the other end of the protect tube (60) to form the connector molding portion (50). The connector molding portion (50) bends to take the shape of "¬". The connector molding portion (50) wraps the first cable (10) and part of the connector (30), capable of preventing intrusion of foreign matters, such as moisture.

While the present invention has been particularly described above with reference to preferred embodiments shown in the drawings, it should be understood that said embodiments are only exemplary and that those of ordinary skill in the art can make various modifications and equivalent substitutions therefrom.

The invention claimed is:

1. A seal mold divided structure for a combination cable comprising a first cable and a second cable, the seal mold divided structure comprising:
   a division molding portion configured to integrally fix to the combination cable and maintain the first cable and the second cable in a divided state separated from each other, wherein the division molding portion comprises:
   an integral portion configured to receive the combination cable and fix an outer surface of an outer sheathing of the combination cable;
   a first division portion coupled to the integral portion, the first division portion formed in a bent shape and the first division portion configured to receive the first cable from the integral portion and form an angle of the first cable according to the bent shape; and a second division portion coupled to the first division portion, the second division portion formed in a straight shape and the second division portion configured to receive the second cable from the integral portion; and a protect tube coupled to the first division portion, wherein the first cable provided from the first division portion is disposed within the protect tube, wherein an inner surface of the protect tube is elliptical, and the inner surface of the protect tube closely fits an outer surface of the first cable, and wherein the first division portion is molded over a first end of the protect tube.

2. The seal mold divided structure for combination cable of claim 1, further comprising:

wherein an outer diameter of the protect tube is less than an inner diameter of the first division portion; and a connector molding portion coupled to the protect tube, the connector molding portion configured to receive the first cable from the protect tube and the connector molding portion is molded over a second end of the protect tube;

a first connector coupled to the connector molding portion, the first connector configured to receive the first cable from the connector molding portion; and a second connector coupled to the second cable, the second connector configured to receive the second cable from the second division portion, wherein the first connector comprises an electronic parking brake (EPB) connector, and wherein the second connector comprises a wheel speed sensor (WSS) extension cable connector.

3. The seal mold divided structure for combination cable of claim 2, wherein the outer surface of the protect tube is circular.

4. The seal mold divided structure for combination cable of claim 3, wherein the first cable comprises two winding displacements.

5. The seal mold divided structure for combination cable of claim 1, further comprising:

a cord grommet portion coupled on an outer surface of the division molding portion; and a mounting bracket coupled to the cord grommet portion.

6. The seal mold divided structure for combination cable of claim 5, wherein said cord grommet portion is coupled on the integral portion.

* * * * *